US 11,544,240 B1

United States Patent
Carlile et al.

(10) Patent No.: US 11,544,240 B1
(45) Date of Patent: Jan. 3, 2023

(54) FEATURIZATION FOR COLUMNAR DATABASES

(71) Applicant: Amazon Technologies, Inc., Seattle, WA (US)

(72) Inventors: Bradley Robert Carlile, Portland, OR (US); Guy Delamarter, Beaverton, OR (US); Akiko Marti, Portland, OR (US); Paul Kinney, Beaverton, OR (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 16/141,868

(22) Filed: Sep. 25, 2018

(51) Int. Cl.
*G06F 16/21* (2019.01)
*G06N 20/00* (2019.01)
*G06F 16/22* (2019.01)
*G06F 16/25* (2019.01)

(52) U.S. Cl.
CPC .......... *G06F 16/212* (2019.01); *G06F 16/221* (2019.01); *G06F 16/258* (2019.01); *G06N 20/00* (2019.01)

(58) Field of Classification Search
CPC .... G06F 16/212; G06F 16/221; G06F 16/258; G06N 20/00
See application file for complete search history.

(56) References Cited

U.S. PATENT DOCUMENTS

| | | | | |
|---|---|---|---|---|
| 2005/0071818 | A1* | 3/2005 | Reissman | G06F 11/3672 717/127 |
| 2005/0216256 | A1* | 9/2005 | Lueck | G10L 15/26 704/10 |
| 2015/0006443 | A1* | 1/2015 | Rose | G06N 20/00 706/12 |
| 2015/0074066 | A1* | 3/2015 | Li | G06F 16/221 707/693 |
| 2018/0357152 | A1* | 12/2018 | Browne | G06F 11/3692 |

* cited by examiner

*Primary Examiner* — Belix M Ortiz Ditren
*Assistant Examiner* — Dustin D Eyers
(74) *Attorney, Agent, or Firm* — Knobbe Martens Olson & Bear LLP (57) ABSTRACT

A database service that receives and manages data into columnar databases. Individual columnar databases or columnar database partitions are associated with a dictionary that provides an encoding for the data in the columnar database. The database service generates count information for the dictionary entries. The database service also maintains one or more augmented dictionary values that correspond to featurization criteria. The database service applies the augmented dictionary values to respond to requests for feature data.

20 Claims, 7 Drawing Sheets

FEATURIZATION FOR COLUMNAR DATABASES

BACKGROUND

Generally described, computing devices and communication networks can be utilized to exchange data or information. In a common application, a computing device can request content from another computing device via the communication network. For example, a user at a personal computing device can utilize a browser application to request a content page (e.g., a network page, a Web page, etc.) or access a service from a server computing device via the network (e.g., the Internet). In such embodiments, the user computing device can be referred to as a client computing device and the server computing device can be referred to as a content provider or service provider.

In some applications, service providers can generate or receive data as part of the interaction with a plurality of user devices or other network-based devices. The service providers may wish to store and maintain the data and make the stored data accessible at a later date. In such applications, the service provider may utilize a network-based database service that can be utilized to receive data via the communication network. The network-based database service can further provide requested data via the communication network. Additionally, the network-based database service can receive commands related to utilization of stored data by other services.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, service providers or content providers can provide or host services that collect or generate data for storage, which can generally be referred to as a data service. With regard to service providers that engage in commerce, the service provider can host one or more services or network resources that interact with user computing devices or other service providers for purposes of facilitating transactions. As part of the interaction or transaction, one or more components of the services/network resources can generate data that the service may wish to store, such as using a network-based database service. Depending on the type of service provider, interaction or transaction, the volume of data transmitted to the database service provider can be large.

In some specific embodiments, data services can provide the database service with data that can be stored in a columnar database format. Generally described, a columnar database format or a column-oriented database format incorporates relational database model and stores user data in in one or more columns with each entry mapped from an index value, such as an individual identifier. Columnar databases are designed in a manner such that individual columns of data are serialized and stored together. Reference to a columnar database can include a single column of stored data or a collection of separate columns of data. Individual columns of data can be referred to generally as column partitions, especially if the individual columns of data are part of the larger data set (e.g., defining a relationship) that can be referred to as the columnar database. Alternatively, individual columns may also be referred to as columnar databases even in embodiments in which there is some relationship between the individual columns. This is contrast from row-based systems in which an entire set of data for individual index values (e.g., a plurality of columns) is stored together. Columnar databases are designed in embodiments in which access to specific columns of data (e.g., corresponding to specific data) is faster and more efficient than accessing entire rows of data to extra the same data. For example, columnar databases may be well suited to us in the context of artificial intelligence ("AI") algorithms. For purposes of the present application, artificial intelligence can generally relate to various technologies utilized to analyze data including, but not limited to, deep learning algorithms, neural network algorithms, machine learning algorithms, big data algorithms, and the like.

Generally described, providing data from columnar data formats to various artificial intelligence algorithms or statistical processing algorithms traditionally requires a multi-step process. For example, the columnar data is first accessed via a relational database query, such as a SQL database query. The resulting data can be encoded in a standardized format, such as JavaScript Object Notation ("JSON"), comma-separated values ("CSV"), and the like. The results of the relational database query are then processed for featurization, which generally replaces numerical values for data strings to facilitate processing by the artificial intelligence algorithms. Other artificial intelligence algorithms, such as deep learning, require the data in a completely different form, such as images or video.

While traditional approaches for AI algorithms to access data from columnar database provide some benefit from targeted access, as described above, such traditional approaches still require the multi-step translation for featurization. For database service providers or other service providers, the multi-step approach requires additional processing resources and creates additional inefficiencies. Additionally, such an approach also adds latencies and inefficiencies from the AI algorithm services attempting to process the columnar database data.

To address potential inefficiencies associated with the utilization of columnar databases with AI algorithms, a database service may implement columnar databases utilizing additional data formats for feature characteristics. More specifically, aspects of the present application correspond to the utilization of augmented dictionary values for columnar data. The augmented dictionary values corresponding to featurization data that transforms data stored in a columnar partition allows featurized data to be directly provided from the columnar database. The database service includes a management component that can process featurization configuration information and generate augmented dictionary values for individual columns of data or aggregates (e.g. sum, max, min, mean, etc.) from other columns that correspond to individual columns.

Generally described, featurization data can be characterized into two major classifications, namely, categorical feature data and numerical feature data. Categorical feature data includes data values having no particular mathematical order, such as gender, eye color, and the like. Typical categorical data can be represented using strings or integers. Numerical feature data includes data values that are quantitative variables taking on a range of values and have a mathematical ordering. Examples of numerical data include income, age, and the like. Numerical feature data can be further characterized as discrete feature data have a relatively small number of available values and continuous feature data having a large number of possible values. Examples of discrete feature data include a number of living parents, number of doors on a car, and the like. Examples of continuous feature data include temperature, inventory numbers, and the like. Cardinality in columnar database can correspond to a number of possible values for any feature.

Illustratively, individual columns of a columnar database include a variety of data values. To facilitate compression, some columnar databases utilize a dictionary that can encode the range of values in a columnar database in a format requiring less data. For example, assume a columnar database includes data identifying one of ten possible engineering school majors (e.g., "mechanical engineering," "electrical engineering, etc.). Rather than maintaining string data in the columnar database, the range of data values can be encoded as values 1-10 in the dictionary and each individual value in the columnar database is represented as one of the ten numerical values. Such strings of numerical values are further amendable for various compression algorithms, such as run length encoding algorithms.

In accordance with aspects of the present application, the management component of the database service can receive featurization definition or featurization configuration data that corresponds to the feature data (e.g., the transformation) required by one or more AI algorithms. Individual features may often group or interpret data values into buckets. Based on the featurization definition data, the management component creates augmented dictionary values for individual columnar databases that maps the columnar database values to various features. For example, a columnar database corresponding to age values can include features related to various age groupings utilized by one or more AI algorithms (e.g., a decade age bucket). The management component can illustratively create a plurality of augmented dictionary values and can further add/remove values as required. For example, an AI algorithm can generate as part of the process additional or modified features/bucketizations that can be added to columns of the columnar database. The management component also stores the transformation and summary information about the featurization so it can be used in processing as well as updating the database. Additionally, the augmented dictionary values can include formatting differences related to the same bucketization as required by different AI algorithms (e.g., floating point format vs. integer).

In accordance with other aspects of the present application, the management component of the database service can also generate count information for entries in the dictionaries that correspond to the number of entries in the column partition having the encoded value. In embodiments in which an AI algorithm or other algorithm utilizes count information, having the count information as part of the dictionary reduces the processing required to traverse individual columns at the time of processing a request from an AI algorithm or other algorithm.

By incorporation of augmented dictionary values and counts, one or more aspects of the present application further facilitate the utilization of columnar databases with AI algorithms. For example, the augmented dictionary values facilitate the return of feature level data directly from the columnar database. More specifically, a management component (or other component) can apply the augmented dictionary values or substitute the augmented dictionary values to return requested data in a defined format. Accordingly, the database service or other service does not require post-database retrieval transformations. Accordingly, deficiencies associated with additional transformations can be mitigated.

In accordance with one or more aspects of the present application, the operations of the database service provider will be described with regard to the management of data for implementation in AI algorithms. However, in other embodiments, the database service can implement at least aspects of the functionality associated with the present application on data that may not be considered for utilization in the illustratively named AI algorithms. Still further, in some embodiments, featurization data may be utilized with algorithms that may not necessarily be considered to be AI algorithms. Accordingly, while the present application will be illustratively described with regard to data for AI algorithms and specific examples of data and featurization, such discussion is illustrative in nature and should not be construed as limiting or exhaustive of all possible applications of one or more aspects of the present application.

Figure 1:
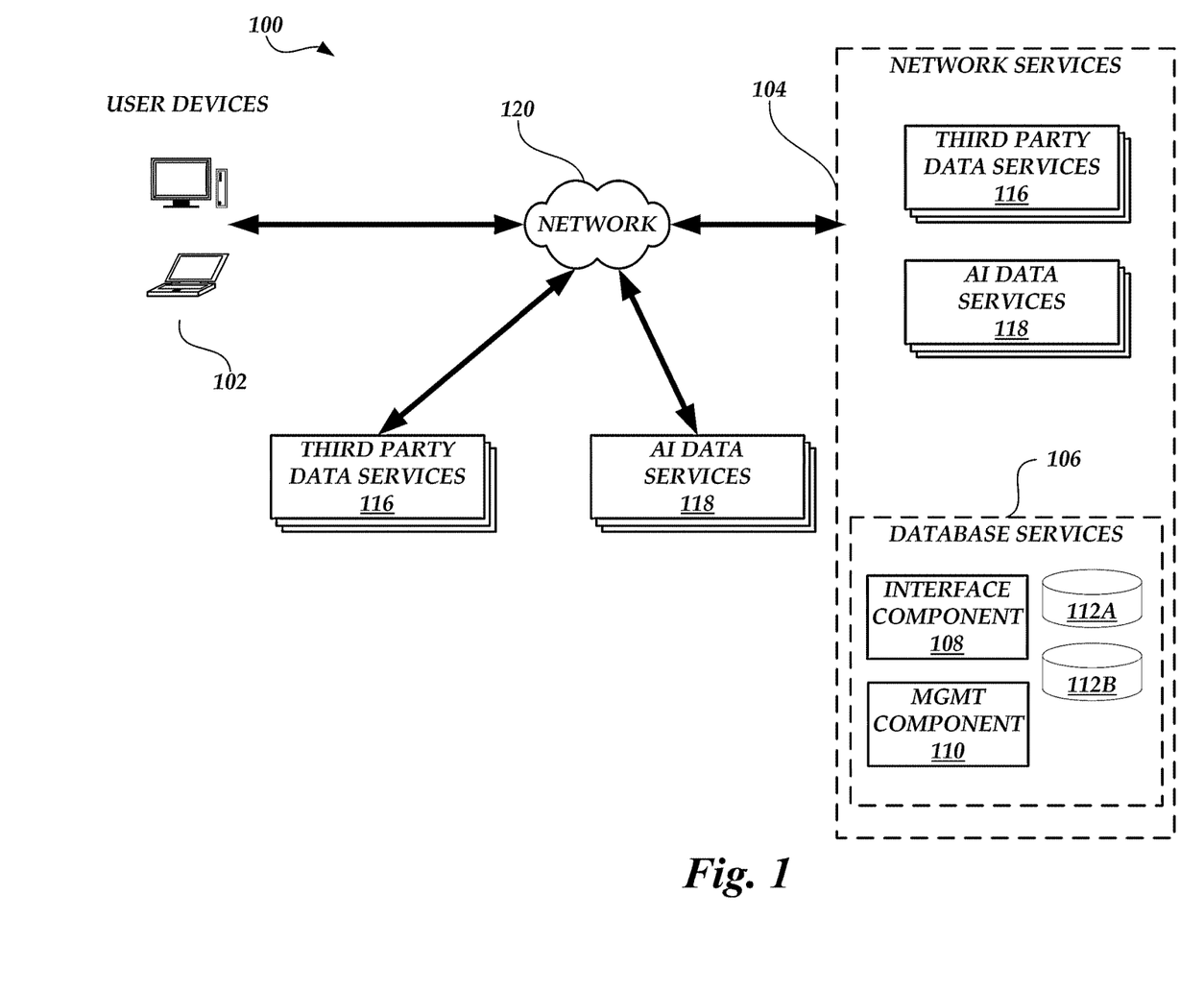
FIG. 1 is a block diagram of a network environment that includes one or more user devices, one or more third-party data services, a network services system, one or more AI data services, and a database service in accordance with some embodiments.

FIG. 1 illustrates a general network environment 100 for the generation, processing and storing of data. Illustratively, network environment 100 will be described with regard to the generation, processing and storage of data in a columnar database format. The network environment 100 includes a plurality of devices 102 utilized by individual users, generally referred to as user computing devices, configured to interact with one or more aspects of the network environment component to request data stored by components of the network environment 100.

User computing devices 102 may include any number of different computing devices capable of communicating with the networks 120, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

Network 120 may be any wired network, wireless network, or combination thereof. In addition, the networks 120 may be a personal area network, local area network, wide area network, cable network, fiber network, satellite network, cellular telephone network, data network or combination thereof. In the example environment of FIG. 1, network 120 is a global area network ("GAN"), such as the Internet. Protocols and components for communicating via the other aforementioned types of communication networks are well known to those skilled in the art of computer communications and thus, need not be described in more detail herein. While the user device 102 is depicted as having a single connection to the network 120, individual components of the user devices 102 may be connected to the network 120 at disparate points. Accordingly, communication times and capabilities may vary between the components of FIG. 1.

The network environment 100 also includes a set of network services, generally referred to as network service 104 or network services 104, that represents a set of network services made available by one or more service providers via a communication network, such as communication network 120. Illustratively, to facilitate the receipt and processing of data, the network services 104 can include database services 106. Database services 106 corresponds to a network-based database service hosted by a service provider. For purposes of illustrating aspects of the present application, the database service 106 includes an interface component 108 for receiving data from data services. Although illustrated as a single component, the interface component 108 logically represents one or more computing devices (physical or virtual) that are configured to receive data from data services. For example, the interface component may correspond to any number of physical or virtual computing devices configured in geographically distinct areas. The database services further include a management component 110 that is configured, at least in part, to manage the storage and processing of data in a columnar database format and to process requests for featurization data associated with the stored data. As described below, the management component 110 can utilize information supplemental to encoded dictionary entries, namely, count information, augmented dictionary values, and information about the augmented dictionary values, to process requests for featurization data. Illustrative components and operation of a management component 110 will be described with regard to FIG. 3.

The database services 106 can include a plurality of data stores 112A and 112B or database nodes for maintaining columnar data in accordance with one or more aspects of the present application. FIG. 1 illustrates multiple data stores 112 for receiving and maintaining data in a columnar database format. The data stores are logically represented together but may be implemented in a distributed manner, such as via geographically distinct areas. In some embodiments, one or more individual nodes 112 can have a single partition for hosting subsets of the data as described herein. In other embodiment, individual nodes 112 can host multiple partitions. Additionally, although represented as single components, individual data stores or multiple data stores may be implemented utilizing a number of physical computing devices, virtual computing devices, or combination thereof. As will be described in detail below, the data stores will maintain subsets of data in partitions. Reference to column partitions in a columnar database format (e.g., individual columns) does not necessarily correspond directly with physical storage partitions of the database nodes 112.

It will be appreciated by those skilled in the art that the network services 104 may have fewer or greater components than are illustrated in FIG. 1. Thus, the depiction of the network services 104 in FIG. 1 should be taken as illustrative.

The network environment 100 can include a plurality of data services, such third party data services 116, for collecting or generating data to be stored in the database service 106. The third party data services 116 may include one or more servers or components that correspond to any one of a variety of functions such as hosting commerce via network 120, providing content via network 120, measuring (directly or indirectly) events and the like. As illustrated in FIG. 1, the third party data services 116 may be hosted as part of the network services 104, such as utilizing virtual machine resources. In some embodiments, the third party data services 116 may be hosted independent of the network services 104, such as in a stand-alone communication network and be connected to the network service(s) via communication network 120. Still further, one or more combinations or various combinations of partially hosted third-party data services 116 may include components associated with the network service 104 and additional independent networks. One skilled in the relevant art will appreciate that reference to third-party data services is intended solely to illustrate the transmission of data to network services and that affiliation of a data service to the network services is not required or prohibited.

The network environment 100 can also include a plurality of AI data services 118 for collecting or processing data stored in the database service 106. The AI data services 118 may include one or more servers or components that correspond to any one of a variety of functions related to the execution of one or more AI algorithms. As described above, AI can generally relate to various technologies utilized to analyze data including, but not limited to, deep learning algorithms, neural network algorithms, machine learning algorithms, big data algorithms, and the like. Any AI data service 118 may execute individual AI algorithms or a plurality of AI algorithms. As illustrated in FIG. 1, the AI data services 118 may be hosted as part of the network services 104, such as utilizing virtual machine resources. In some embodiments, the AI data services 118 may also be hosted independent of the network services 104, such as in a stand-alone communication network and be connected to the network service(s) via communication network 120. Still further, one or more combinations or various combinations of partially hosted AI data services 118 may include components associated with the network service 104 and additional independent networks.

Figure 2:
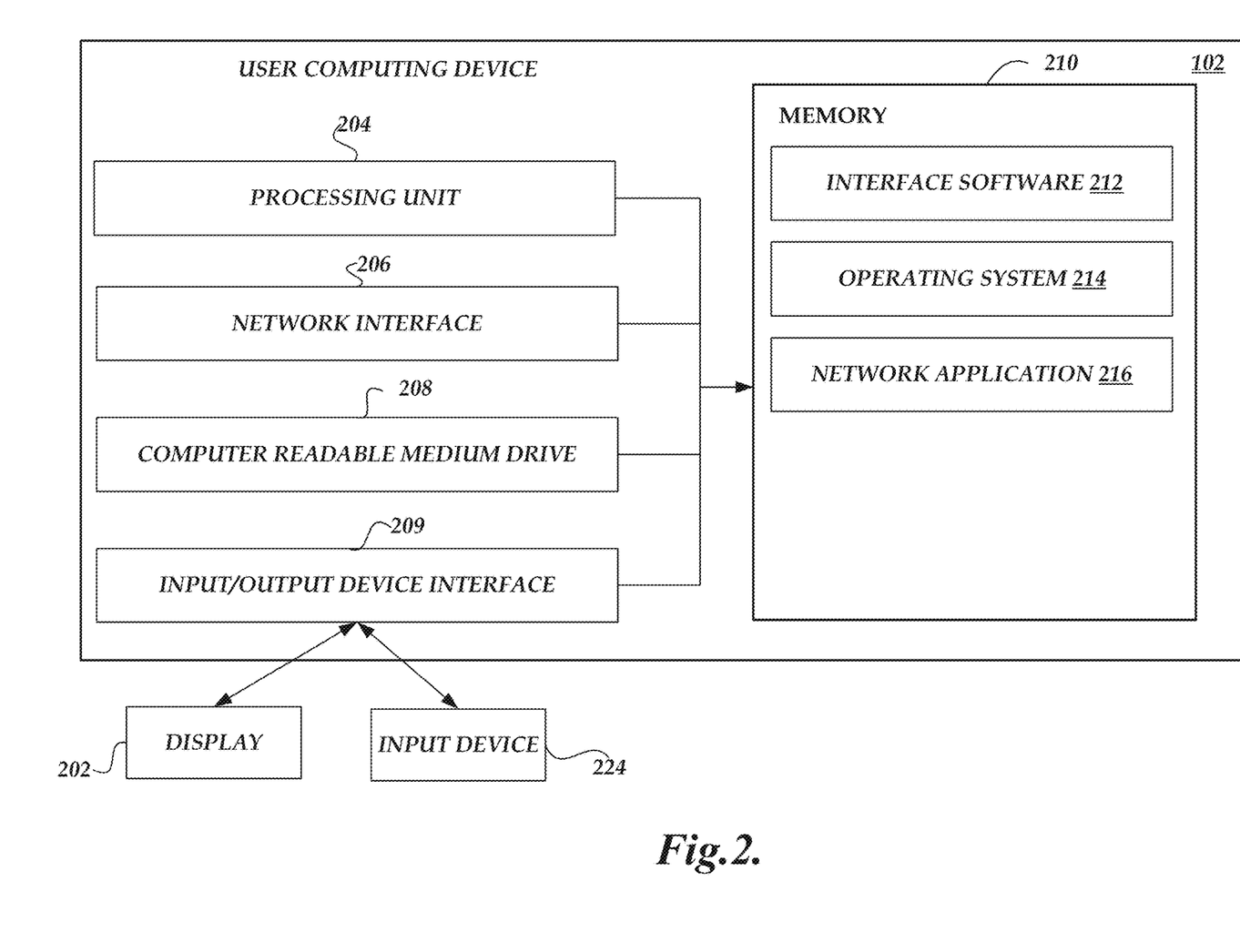
FIG. 2 is a block diagram illustrative of components of user device for interacting with data services or database service in accordance with some embodiments.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 120 of FIG. 1, and the network services 104. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for transmitting data from the user device 102. In some embodiments, the memory 210 may include one or more additional software applications or components that are configured, at least in part, to transmit commands related to configuration of the columnar database, including the configuration of featurization criteria, as described herein. For example, network application 217 may be configured to request or transmit feature criteria or definitions to the database service 106.

Figure 3:
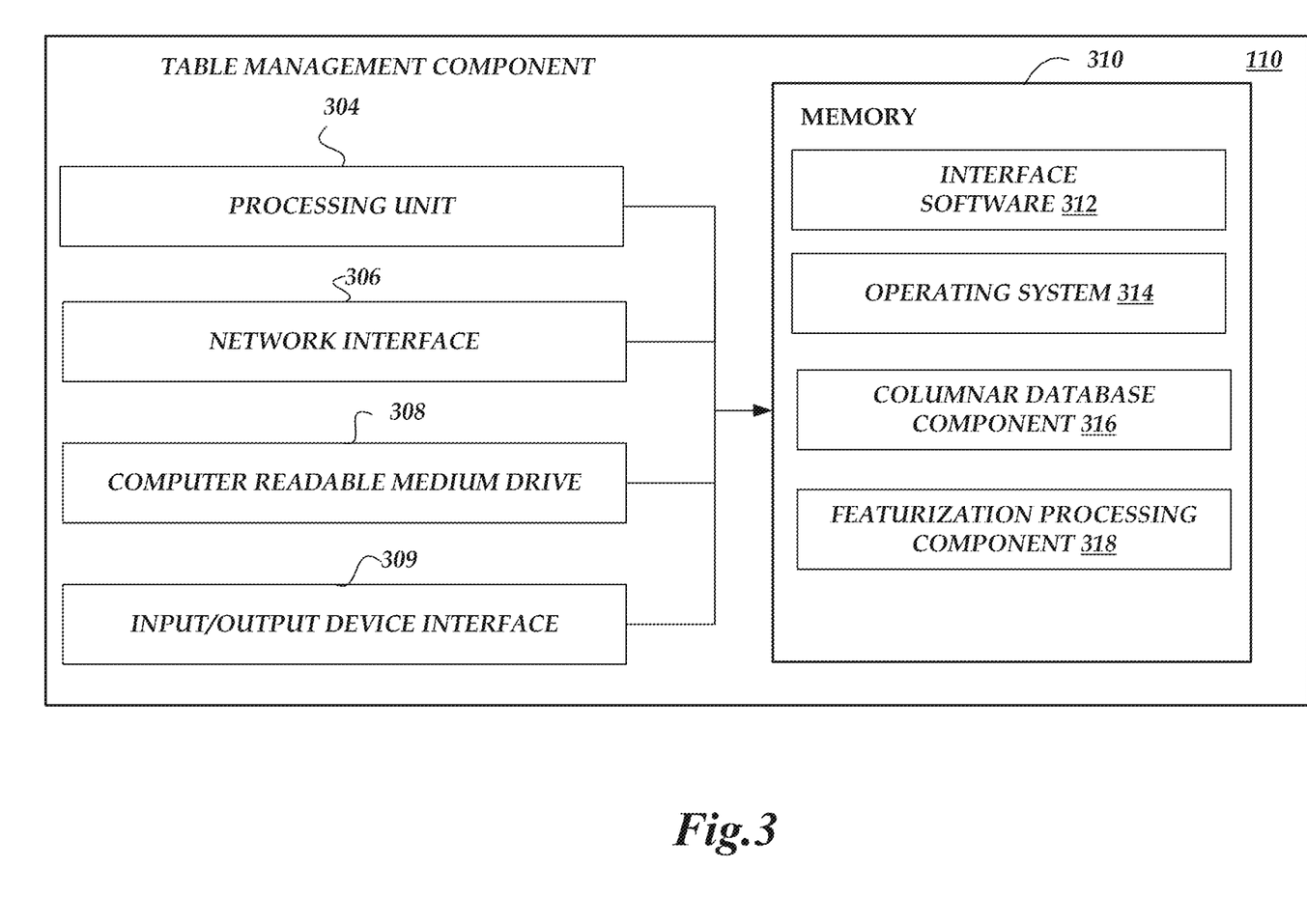
FIG. 3 is a block diagram illustrative of components of a management component of a database service for managing the databases for utilization by AI data services in accordance with some embodiments.

FIG. 3 depicts one embodiment of an architecture of an illustrative computing device for implementing various aspects of the management of the data tables utilized to store data (or other data) in accordance with aspects of the present application. The computing device 300 can be a part of the database services 106, such as a management component 110. Alternatively, the computing device may a stand-alone device independent of the database services 106.

The general architecture of the computing device 300 depicted in FIG. 3 includes an arrangement of computer hardware and software components that may be used to implement aspects of the present disclosure. As illustrated, the computing device 300 includes a processing unit 304, a network interface 306, a computer readable medium drive 308, an input/output device interface 309, all of which may communicate with one another by way of a communication bus. The components of the computing device 300 may be physical hardware components or implemented in a virtualized environment.

The network interface 306 may provide connectivity to one or more networks or computing systems, such as the network 120 of FIG. 1. The processing unit 304 may thus receive information and instructions from other computing systems or services via a network. The processing unit 304 may also communicate to and from memory 310 and further provide output information for an optional display via the input/output device interface 409. In some embodiments, the computing device 300 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the computing device 300. The memory 310 may further include computer program instructions and other information for implementing aspects of the present disclosure. For example, in one embodiment, the memory 310 includes interface software 312 for receiving and processing data. Memory 310 includes a columnar database component 316 for generating or storing data in one or more columnar databases. The memory 310 further includes a featurization processing component 318 for the generation and management of featurization information for the columnar databases, including the generation of augmented dictionary values as described herein.

As specified above, in one embodiment, the computing device 300 illustrated in FIG. 3 can be implemented as physical computing devices or virtualized computing devices in a computing network. In another embodiment, the computing device 300 may be implemented as logical components in a virtual computing network in which the functionality of the computing device 300 is implemented by an underlying substrate network of physical computing devices. Thus, aspects of the present application should not be limited to interpretation requiring a physical, virtual or logical embodiment unless specifically indicated as such.

Figure 4A:
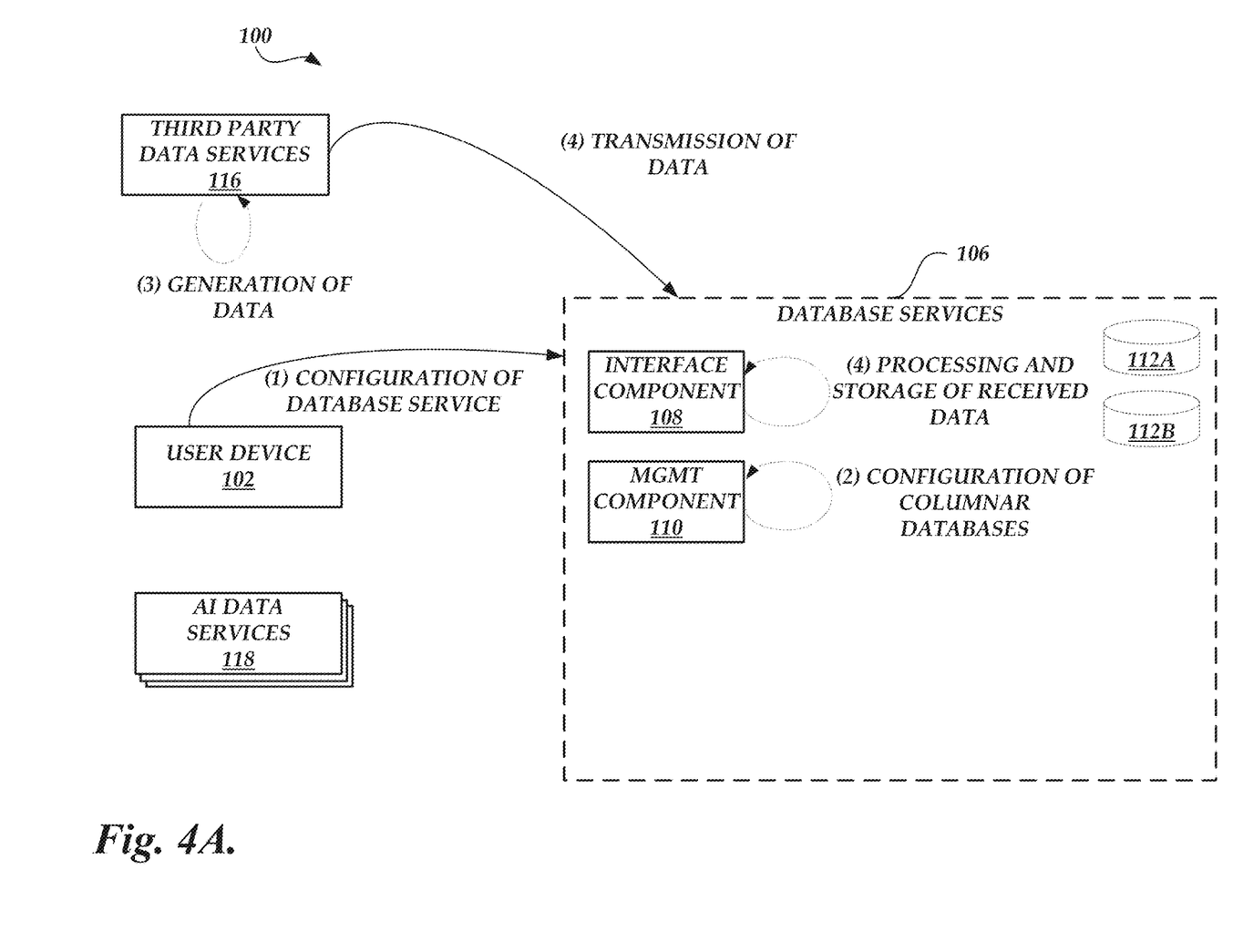
FIGS. 4A-4B are block diagrams of the network environment of FIG. 1 illustrating the generation and management of augmented dictionary values in columnar database in accordance with some embodiments.
Figure 4B:
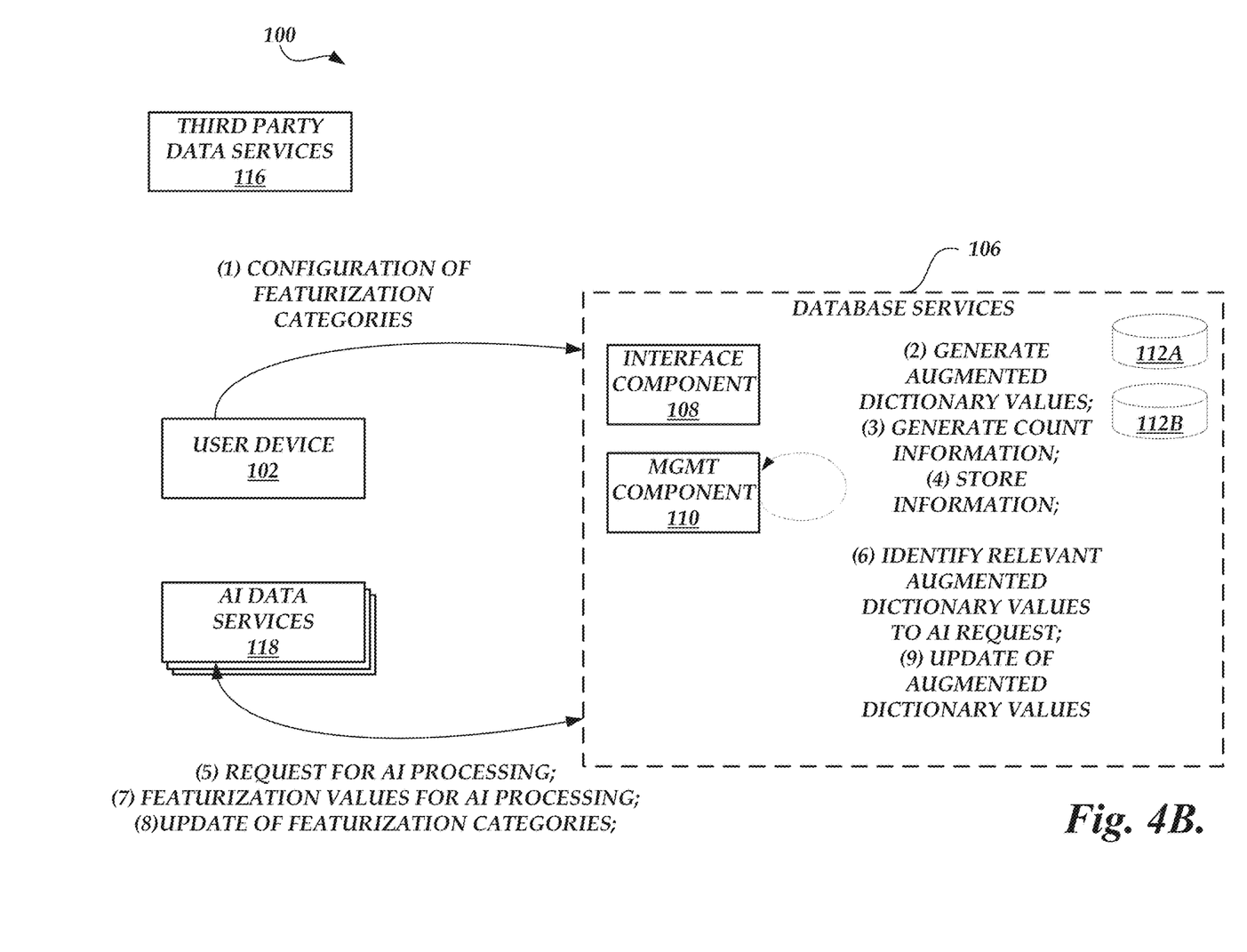

Turning now to FIGS. 4A and 4B, an illustrative interaction for the configuration of columnar databases for utilization with AI algorithms will be described. For purposes of illustration, it is assumed that an illustrative third-party data service 116 or other customer has engaged to provide data to the database service 106. At (1), the database service 106 can receive a request or configuration from the user device 102 to process received data (or other data). Such a request can establish at least a portion of the access control parameters or otherwise specify financial or performance metrics for the storage and retrieval of the data. For example, the request can include a specification of the size thresholds or timing information that be utilized to establish the number of columnar database partitions or columnar databases utilized to store the data, performance criteria that may be utilized by the database service to determine the number of partitions, or other information relevant to how received data is received and stored at the database service. For example, the configuration of the columnar database may provide sizing thresholds that establish a maximum number of records that can included in a single columnar partition. In some embodiments, the request may specifically call out the configuration of the columnar database or columnar database format. In other embodiments, the database service 106 may select the columnar database format to fulfill the requested service, e.g., interface with an AI data services 118.

At (2), the management component 110 of the database service 106 initially creates or causes to be created one or more columnar databases for receipt of data. The partitions are configured to receive at least subsets of data from a third-party data service 116. Illustratively, the number and configuration of the columnar databases can be based on criteria, such as redundancy, performance, user specified parameters and the like.

At (3), a data service 116 generates or collects data and transmits at least subsets of the data to the database services 106 at (4). At (5), after receipt, the database service 106 stores the receiving set of data by writing subsets of the collected data into database nodes 112A, 112B in a columnar database format. Although not illustrated in FIG. 4A, the allocation of partitions and storage of the data can be dynamic in nature. For purposes of illustration, at least some of the received data will be stored in a columnar database format. However, in some embodiments, some portion of the received data may be stored in other database formats. As described above, a set of data may be associated with a plurality of individual columns or columnar partitions. Individual columns may correspond to a different data type/identifier in a data set. Additionally, in some embodiments, a data set may have a number of entries exceeding a specified or established sizing threshold. In these cases, multiple columnar partitions may be utilized to store the same data type/identifier (e.g., splitting up a large number of records into multiple columnar partitions). For embodiments in which individual columnar partitions store the same data type/identifier, the management component 110 can utilize the same dictionary with encodings for each columns. Still further, the management component 110 can then optimize individual dictionary encodings for the specific data include in the column. However, even in embodiments in which individual split columns have optimized individual dictionary embodiment, the columns (e.g., the "split columns") will have common augmented dictionary values or share a common augmented dictionary."

With reference now to FIG. 4B, at some point in time, the database service 106 can receive and process featurization definition criteria that will be utilized to configure at least an initial set of augmented dictionary values for the collected columnar data. In some embodiments, the receipt of the featurization criteria can coincide with the initial configuration of the database service 106. Alternatively, the receipt of the featurization data may occur independently of the configuration of database service 106, such as during the collection of the data or upon completion of the collection of data (or some milestone associated with the collection of data).

As illustrated in FIG. 4B, at (1), the user device 102 can transmit a configuration of featurization category information to the database service 106. As described above, featurization data can be characterized into two major classifications, namely, categorical feature data and numerical feature data. Categorical feature data includes data values having no particular mathematical order, such as county of birth, dominant hand or foot, and the like. Typical categorical data can be represented using strings or integers. Numerical feature data includes data values that are quantitative variables taking on a range of values and have a mathematical ordering. Examples of numerical data include income, age, and the like. Numerical feature data can be further characterized as discrete feature data have a relatively small number of available values and continuous feature data having a large number of possible values. Examples of discrete feature data include shoe size, number of televisions in a household, and the like. Examples of continuous feature data include height, financial account information, and the like. Cardinality in a columnar database corresponds to a number of possible values for any feature.

Illustratively, featurization data for utilization in AI algorithms, such as AI algorithms executed in AI data services 118, can incorporate a number of transformations. Examples of such transformations can include numeric transformations that convert various types of data into a format accepted by specific AI algorithms. One example is the conversion of integers or other numeric expression into a floating point representation, such as a 32-bit floating point. Another example of a transformation can include normalization that can standardize or normalize data into more defined ranges better suited for AI algorithms. Examples of standardization or normalization include, but are not limited to, linear scaling, min/max scaling, mean normalization, standard deviation normalization, logarithmic scaling, z-score transforms and the like. Yet another transformation can include single value vector transforms or low cardinality vectorization in which columns are split into multiple, single value columns/vectors. For example, columnar data values across the column can be mapped into multiple transformations (e.g., individual features) in which each transformation corresponds to the presence of one of the values in the original columnar data. Illustratively, each transformation corresponds to a Boolean value (e.g., "1" or "0") as to whether that value is present in the row.

Another example of transformations relates to one or more grouping features. One example of grouping features includes binarizer transforms in which numerically defined values are thresholded into binary values, such as by linear thresholding or logistic functions. Another example of grouping features is quantile discretization in which values are associated with bins or quantiles, typically in a linear manner. In still another example of grouping features, a hashing function can be applied to reduce the cardinality of numeric values, with the hashing function as the modulo operator. In yet another example, columns of high cardinality may also be mapped into feature vectors of high dimensionality, so called embeddings, in which relationships between the columnar data values are represented. Illustratively, embedded values or embedding information may be high beneficial for AI algorithm processing and may be the suggested additions or feedback provided by an AI algorithm based on previous iterations.

At (2), the management component 110 creates augmented dictionary values for individual columnar partition dictionaries that maps the columnar database dictionary values to a corresponding transformation as defined in the received feature configuration information. More specifically, for each dictionary entry corresponding to a columnar database or columnar partition, a transformed value for the identified feature will be provided. At (3), the management component 110 can generate count information related to the dictionary values. Generally described, count volumes for the dictionary entries can accelerate the return of information without requiring scanning of the underlying data at the time of request. As will be explained in greater detail, the generated count information will be applicable to the dictionary values as well. Still further, additional analytical information, such as normalization or standardization functions may also be calculated utilizing the count information. At (4), the management component 110 stores the resulting augmented dictionary values and count information. Illustratively, steps 1-4 may be repeated for subsequent or supplemental configurations of the featurization categories. For example, the user device 102 may modify previously configured features or add additional features.

As will be described in greater detail below, in some embodiments, the management component 110 can further generate metadata about the dictionary entries, count information and augmented dictionary values. The metadata can illustratively describe characteristics about the data in the respective dictionary, count information or augmented dictionary values that may be used in the processing of requests. For example, metadata can include maximum values and minimum values or ranges of values for a dictionary or augmented dictionary value. For example, assume a dictionary defines encoding for columnar data associated with ages for a set of individuals. Assume one of the augmented dictionary values transforms the encoded age based on decade of birth. The management component 110 can generate and store metadata identifying the maximum encoding value, the minimum encoding value or other calculations for the dictionary. Similarly, the management component 110 can generate and store metadata identifying the maximum value, the minimum value or other calculations for the augmented dictionary values.

With continued reference to FIG. 4B, after the initial or subsequent configuration of the featurization categories, at (5), the AI data services 118 transmits a request for columnar data for use in AI processing or in execution of an AI algorithm. Illustratively, the AI data services 118 can either request specific feature data known to have been configured by the database service 106 or identify the AI algorithm that will be utilizing the requested information. The request can include various identifying information or other metadata that can be utilized by the database service 106 to process the request, such as client identifiers, etc. In some other embodiments, the request from the AI data services 118 or other service can also correspond to the augmented dictionary values maintained by the database service 106, such providing the transformations for various encoding values independent of any specific data in the columnar partition/columnar database.

At (6), for columnar data that is not responsive to the request, the management component 124 identifies the relevant augmented dictionary values that would be responsive to the request. Accordingly, the management component 110 can apply the augmented dictionary value by substituting the values from the columnar data with the corresponding augmented dictionary value mapped to the encoding. In other embodiments, application of the augmented dictionary value can include some form of additional mathematical processing or other processing. At (7), the interface component 108 (or other component) transmits the requested data, such as the transformed data, to the AI data services 118.

In some embodiments, the AI data services 118 can implement a feedback loop to the received data from the database service 106 to modify or supplement the feature definitions. For example, the AI data services 108 can provide additional configuration information for the featurization categories or make modifications to a previously configured category. Such feedback can be provided responsive to the results of the execution of the AI algorithm, based on modifications to the AI algorithms or to configure additional AI algorithms. Accordingly, at (8), the AI data services 118 can transmit updates to the featurization categories. At (9), the management component 110 generates updated augmented dictionary values corresponding to the updates from the AI services.

Generally described, by utilization of the augmented dictionary values and count information, the database service 106 can provide, at least in part, data responsive to a request from an AI data service 118 while mitigating the need for additional data formatting or transformations after the underlying information would otherwise be retrieved from a columnar database. This approach can increase the efficiency of the processing resources required by the database service 106, AI data service 118 or other service to make data available for execution in various AI algorithms or other algorithms. Additionally, the incorporation of the feedback loop in some embodiments further increases the efficiencies in execution by refinement of the featurization information.

Figure 5A:
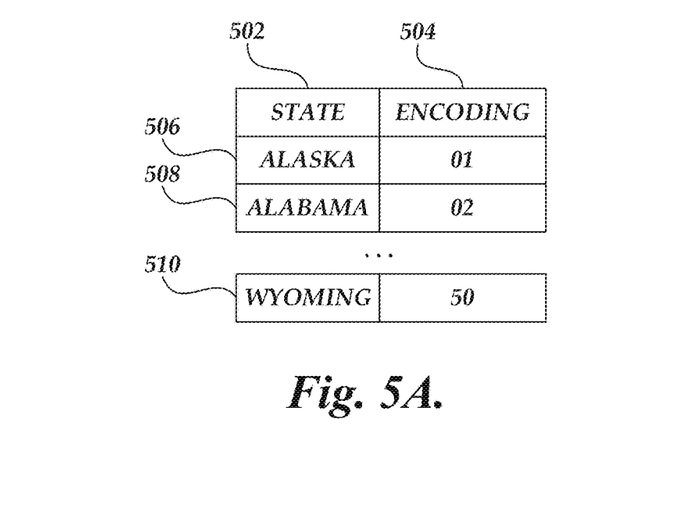
FIGS. 5A-5C are block diagrams illustrating the supplementing of a columnar database with additional information including counter information and augmented dictionary values for featurization in accordance with some embodiments.
Figure 5B:
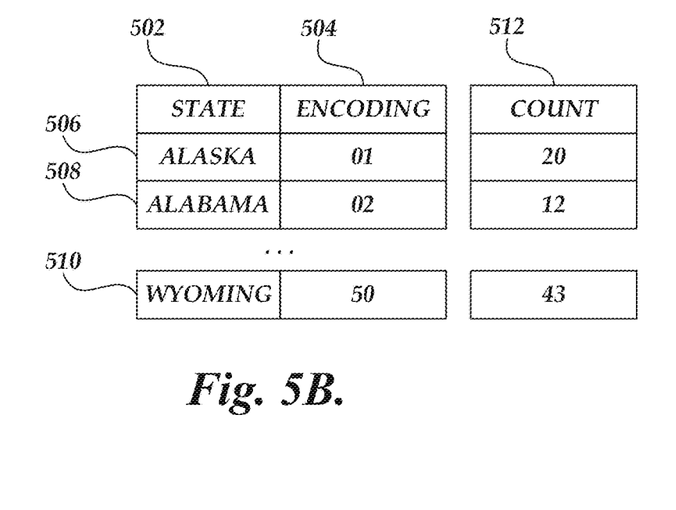
Figure 5C:
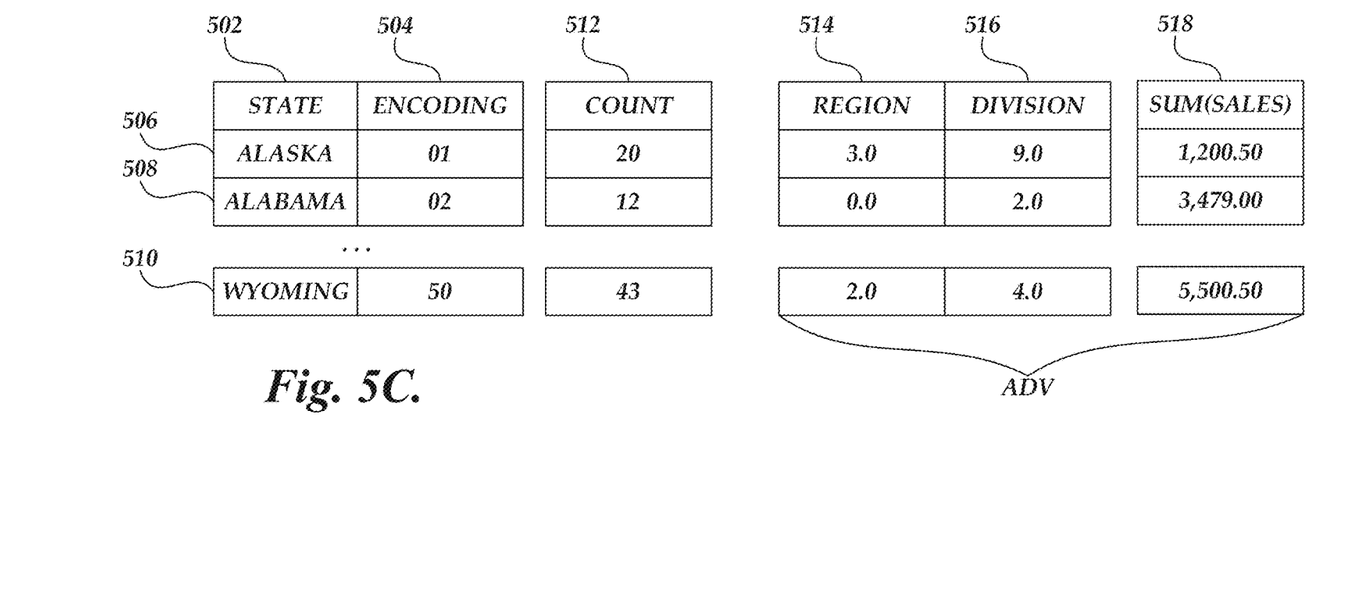

Turning now to FIGS. 5A-5C, the supplementing of a columnar database with additional information including counter information and augmented dictionary values for featurization in accordance with some embodiments will be described. With reference first to FIG. 5A, an illustrative traditional dictionary for a columnar database will be described. In this example, the underlying columnar database values correspond to an identification of a state (such as state of residence) such that each entry in the columnar database corresponds to an entry for a different user/customer. To reduce the amount of data encoded in the columnar database, the dictionary value allows the encoding of a number in the range of 1-50 in the columnar database. For example, row 506 of the dictionary value indicates that the string "Alaska" can be represented as the numeral "01." Similarly, row 508 indicates that the string "Alabama" can be represented as the numeral "02." Assuming all 50 states are represented, row 510 indicates that the string "Wyoming" can be represented as the number "50." In this example, because we assume that all 50 states are represented, the dictionary values can include a range of 50 possible values. In other examples, if less than 50 states are represented in a specific columnar partitions, the dictionary can define encoding in range less than 50. For example, columnar data specifying 38 states could be optimized such that the dictionary would only include 38 encodings and states not included in the columnar partition would not have a corresponding encoding. To minimize data in the columnar database and to facilitate compression, the string values that would have been stored in the columnar database are replaced with the numerical values. Accordingly, a request for a particular value in the columnar database would return a numerical value that would then be translated to the string.

In accordance with an aspect of the present application, in a first supplement to dictionary values, the management component 110 can generate count information for each dictionary entry that identifies the number of entries in the columnar database that have the encoded value. As illustrated in FIG. 5B, in one embodiment, the dictionary can be supplemented with metadata corresponding to an additional column 512 that identifies count information for at least a portion of the dictionary entries. For example, row 506 indicates that 20 entries have an 01 encoding corresponding to the string "Alaska." Row 508 indicates that 12 entries have an 02 encoding corresponding to the string "Alabama." Row 510 indicates that 43 entries have a 50 encoding corresponding to the string "Wyoming." By calculating the count information in advance and storing the additional row, the management component 110 can provide count information to an AI data service 118 or other requester without having to traverse the columnar database for the count information. This provides additional efficiencies and performance.

In accordance with an aspect of the present application, in an additional supplement to dictionary values, the management component 110 can generate the feature transformation for each dictionary entry, generally referred to as the augmented dictionary value. Each column in the augmented dictionary values can provide a different transformation for the columnar data value (as encoded by the dictionary entry). By way of illustration, augmented data value column 514 provides transformations for the columnar "State" values by regional buckets. Augmented data value column 516 provides a different transformation for the columnar "State" values by division buckets. For example, an AI algorithm utilizing regional features as inputs, would receive a value of "3.0" for columnar data indicative of the string "Alaska." Augmented data value column 518 provides yet another transformation for the columnar "State" value using aggregations (e.g. sum, mean, max, min, last, etc.) of other columns that correspond to that state. Column 518 is the sum of all of the sales corresponding to each of the states. For example, an AI algorithm utilizing "Sum (Sales)" feature as input, would receive a value of "1,200.50" for the columnar data indicative of the string "Alaska." As described above, the value provided to the AI algorithm in this example would be formatted in a manner that would be usable by the AI algorithm without additional or with fewer transformations.

In some embodiments, the management component 110 can further generate metadata about the dictionary entries, count information and augmented dictionary values. The metadata can illustratively describe characteristics about the data in the respective dictionary, count information or augmented dictionary values that may be used in the processing of requests. For example, metadata can include maximum values and minimum values or ranges of values for a dictionary or augmented dictionary value. The management component 110 can generate and store metadata identifying the maximum encoding value, the minimum encoding value or other calculations for the dictionary. For example, assume a dictionary defines encoding for columnar data associated with ages for a set of individuals. With reference to FIG. 5C, metadata about column 504 could indicate a maximum encoding value (e.g., "50"), a minimum encoding value (e.g., "01"), statistical distributions of the encoding, and the like. Similarly, the management component 110 can generate and store metadata identifying the maximum value, the minimum value or other calculations for the augmented dictionary values. With reference to FIG. 5C, metadata about column 514 could indicate a maximum encoding value (e.g., "3.0"), a minimum encoding value (e.g., "0.0"), statistical distributions of the region transformation values, and the like. Illustratively, the management component 100 can update augmented dictionary values, metadata, and counts responsive to a variety of events, such as inserts, deletes, or updates to the columnar database.

Figure 6:
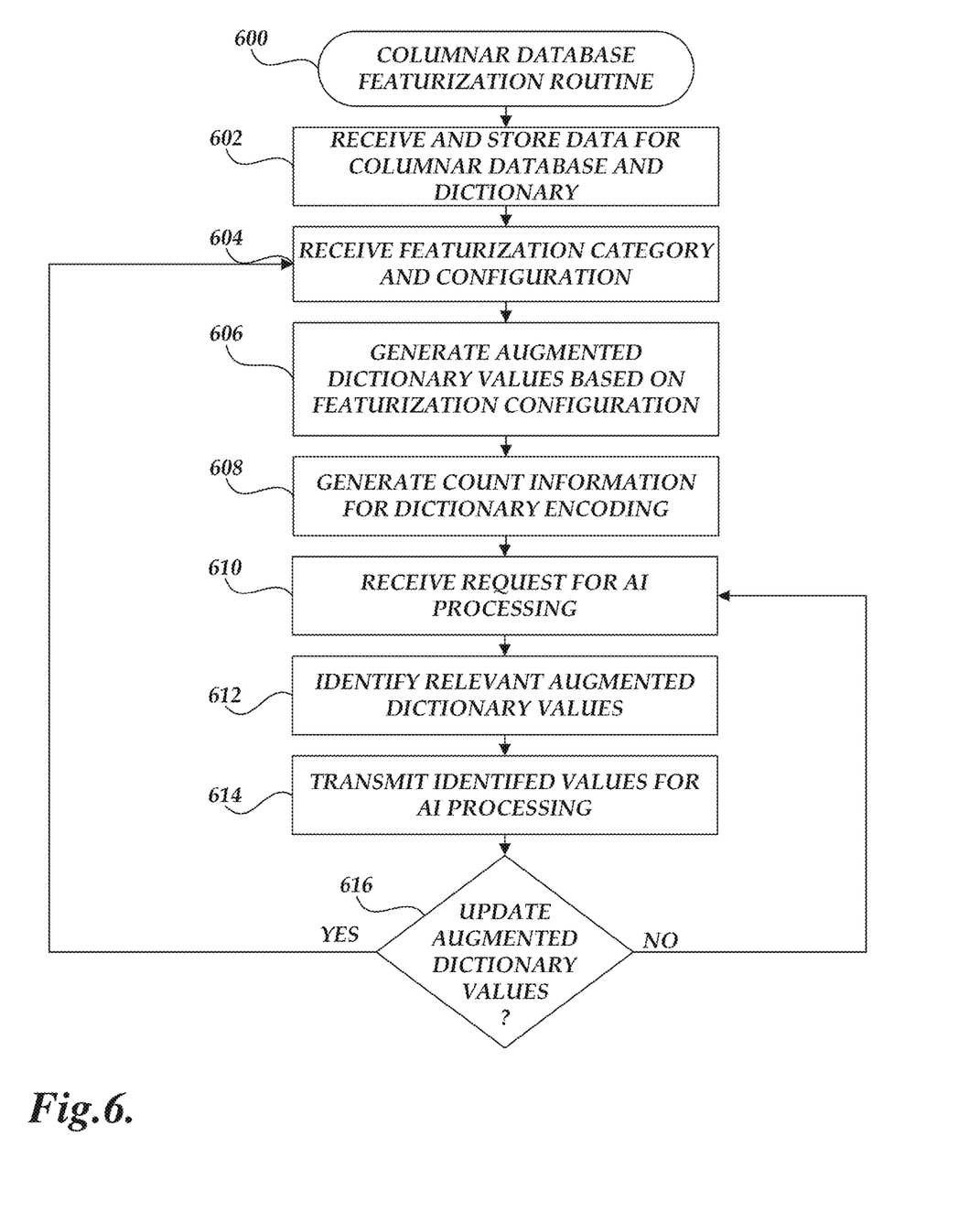
FIG. 6 is a flow diagram illustrative of a columnar database featurization processing routine implemented by a database service in accordance with some embodiments.

With reference to FIG. 6, a flow diagram 600 illustrative of a columnar featurization routine 600 implemented by the database service 106 will be described. Illustratively, routine 600 can be implemented upon configuration of the database service 106 to receive data from a third-party data service 116 or other source. As previously described, it is assumed that an illustrative third-party data service 116 has engaged to provide data to the database service 106.

Illustratively, the database service 106 can receive a request or configuration from the user device 102 to process received data (or other data). Such a request can establish at least a portion of the access control parameters or otherwise specify financial or performance metrics for the storage and retrieval of the data. For example, the request can include a specification of the size thresholds or timing information that be utilized to establish the number of columnar databases utilized to store the data, performance criteria that may be utilized by the database service to determine the number of partitions, or other information relevant to how received data is received and stored at the database service. In some embodiments, the request may specifically call out the configuration of the columnar database or columnar database format. In other embodiments, the database service 106 may select the columnar database format to fulfill the requested service, e.g., interface with an AI data services 118. Additionally, the management component 110 of the database service 106 initially creates or causes to be created one or more columnar databases for receipt of data. The partitions are configured to receive at least subsets of data from a third-party data service 116. Illustratively, the number and configuration of the columnar databases can be based on criteria, such as redundancy, performance, user specified parameters and the like.

At block 602, the database service 106 receives data from one or more data services 116 and stores the receiving set of data by writing subsets of the collected data into database nodes 112A, 112B in a columnar database format. For purposes of illustration, at least some of the received data will be stored in one or more column partitions associated with a columnar database format. As described above, a set of data may be associated with a plurality of individual columns or columnar partitions. Individual columns may correspond to a different data type/identifier in a data set. Additionally, in some embodiments, a data set may have a number of entries exceeding a specified or established sizing threshold. In these cases, multiple columnar partitions may be utilized to store the same data type/identifier (e.g., splitting up a large number of records into multiple columnar partitions). For embodiments in which individual columnar partitions store the same data type/identifier, the management component 110 can utilize the same dictionary with encoding (as optimized for the specific data include in the column). Still further, in some embodiments, some portion of the received data may be stored in other database formats.

As described above, at some point in time, the database service can receive and process featurization definition or configuration criteria that will be utilized to configure at least an initial set of augmented dictionary values for the collected columnar data. In some embodiments, the receipt of the featurization criteria can coincide with the initial configuration of the database service 106. Alternatively, the receipt of the featurization data may occur independently of the configuration of database service 106, such as during the collection of the data or upon completion of the collection of data (or some milestone associated with the collection of data).

At block 604, the database service 106 receives configuration of featurization category information. The configuration information can be transmitted from a user device 102 or provided by an AI data service 118. For example, the featurization category information or configuration information may be received as part of a feedback loop in which an AI algorithm (or user) makes changes to the featurization information for a columnar database. As described above, featurization data can be characterized into two major classifications, namely, categorical feature data and numerical feature data. Categorical feature data includes data values having no particular mathematical order, such as county of birth, dominant hand or foot, and the like. Typical categorical data can be represented using strings or integers. Numerical feature data includes data values that are quantitative variables taking on a range of values and have a mathematical ordering. Examples of numerical data include income, age, and the like. Numerical feature data can be further characterized as discrete feature data have a relatively small number of available values and continuous feature data having a large number of possible values. Examples of discrete feature data include shoe size, number of televisions in a household, and the like. Examples of continuous feature data include height, financial account information, and the like. Cardinality in columnar database can correspond to a number of possible values for any feature.

Illustratively, featurization data for utilization in AI algorithms, such as AI algorithms executed in AI data services 118, can incorporate a number of transformations. Examples of such transformations can include numeric transformations that convert various types of data into a format accepted by specific AI algorithms. One example is the conversion of integers or other numeric expression into a floating point representation, such as a 32-bit floating point. Another example of a transformation can include normalization that can standardize or normalize data into more defined ranges better suited for AI algorithms. Examples of standardization or normalization include, but are not limited to, linear scaling, min/max scaling, mean normalization, standard deviation normalization, logarithmic scaling, z-score transforms and the like. Yet another transformation can include single value vector transforms or low cardinality vectorization in which columns are split into multiple, single value columns/vectors. For example, columnar data values across the column can be mapped into multiple transformations (e.g., individual features) in which each transformation corresponds to the presence of one of the values in the original columnar data. Illustratively, each transformation corresponds to a Boolean value (e.g., "1" or "0") as to whether that value is present in the row. Such single value vector transformations or vector encoding can be applied for low cardinality columns in which a number of different values in a specific original column of data is relatively low or below a threshold amount of data.

Another example of transformations relates to one or more grouping features. One example of grouping features includes binarizer transforms in which numerically defined values are thresholded into binary values, such as by linear thresholding or logistic functions. Another example of grouping features is quantile discretization in which values are associated with bins or quantiles, typically in a linear manner. In still another example of grouping features, a hashing function can be applied to reduce the cardinality of numeric values, with the hashing function as the modulo operator. In yet another example, columns of high cardinality may also be mapped into feature vectors of high dimensionality, so called embeddings, in which relationships between the columnar data values are represented.

At block 606, the management component 110 creates augmented dictionary values for individual columnar databases that maps the columnar database values to various features utilizing the received configuration information. More specifically, for each dictionary entry corresponding to a columnar database, a transformed value for the feature will be provided.

At block 608, the management component 110 can generate count information related to the dictionary values. Generally described, count volumes for the dictionary entries can accelerate the return of information without requiring scanning of the underlying data at the time of request. As will be explained in greater detail, the generated count information will be applicable to the dictionary values as well. Still further, additional analytical information, such as normalization or standardization functions may also be calculated utilizing the count information. The management component 110 stores the resulting augmented dictionary values and count information. Illustratively, blocks 604 and 606 may be repeated for subsequent or supplemental configurations of the featurization categories. For example, the user device 102 may modify previously configured features or add additional features.

As described above, in some embodiments, the management component 110 can further generate metadata about the dictionary entries, count information and augmented dictionary values. The metadata can illustratively describe characteristics about the data in the respective dictionary, count information or augmented dictionary values that may be used in the processing of requests. For example, metadata can include maximum values and minimum values or ranges of values for a dictionary or augmented dictionary value. For example, assume a dictionary defines encoding for columnar data associated with ages for a set of individuals. Assume one of the augmented dictionary values transforms the encoded age based on decade of birth. The management component 110 can generate and store metadata identifying the maximum encoding value, the minimum encoding value or other calculations for the dictionary. Similarly, the management component 110 can generate and store metadata identifying the maximum value, the minimum value or other calculations for the augmented dictionary values.

At block 610, after the initial or subsequent configuration of the featurization categories, the AI data services 118 transmits a request for data for use in AI processing or in execution of an AI algorithm. Illustratively, the AI data services 118 can either request specific feature data known to have been configured by the database service 106 or identify the AI algorithm that will be utilizing the requested information. The request can include various identifying information or other metadata that can be utilized by the database service 106 to process the request, such as client identifiers, etc. The request can correspond to a request for count information or a request for augmented dictionary values independent of the columnar data. At block 612, for columnar data that is not responsive to the request, the management component 124 identifies the relevant augmented dictionary values that would be responsive to the request. Accordingly, the management component can apply the augmented data values by substituting the values from the columnar data with a corresponding augmented dictionary value. Alternatively, the augmented dictionary value can further have some expressions or logic that may involve additional processing by the management component 110 to apply the augmented dictionary value. At block 614, the interface component 108 (or other component) transmits the transformed data or other requested data with responsive to the request from the AI data services 118.

In some embodiments, the AI data services 118 can implement a feedback loop to the received data from the database service 106 to modify or supplement the feature definitions. For example, the AI data services 118 can provide additional configuration information for the featurization categories or make modifications to a previously configured category. Such feedback can be provided responsive to the results of the execution of the AI algorithm, based on modifications to the AI algorithms or to configure additional AI algorithms. Accordingly, at decision block 616, a test is conducted to determine whether there is a request for an update of the augmented dictionary values, such as from the AI data services 118. If so, the routine 600 returns to block 604 where the AI services 118 (or other entity) can transmit updates to the featurization categories and the management component 110 generates updated augmented dictionary values corresponding to the updates from the AI services. Alternatively, if there is no update to the augmented dictionary values, the routine 600 can return to block 610 to process additional or subsequent requests for data.

Generally described, by utilization of the augmented dictionary values and count information, the database service 106 can provide, at least in part, data responsive to a request from an AI data service 118 while mitigating the need for additional data formatting after the underlying information would otherwise be retrieved from a columnar database. This approach can increase the efficiency of the processing resources required by the database service 106, AI data service 118 or other service to make data available for execution in various AI algorithms. Additionally, the incorporation of the feedback loop in some embodiments further increases the efficiencies in execution by refinement of the featurization information.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage data comprising:
one or more computing devices comprising one or more processors coupled to a memory including computer-executable instructions for implementing a management component of a database service, wherein the management component is configured to:
configure a columnar database for storage of data, wherein configuration of the columnar database includes a configuration of a dictionary corresponding to a columnar partition forming the columnar database, wherein the dictionary defines an encoding of data to be stored in the columnar partition;
receive a set of data from a data service;
store the set of data in an encoded format in the columnar partition based on application of the dictionary;
receive one or more feature configurations for the set of data stored in the columnar partition, wherein the one or more feature configurations define at least one transformation to be applied to the set of data for transforming the set of data into a format for utilization in an at least one artificial intelligence algorithm;
generate at least one augmented dictionary value from the set of the data stored in the columnar partition based on the one or more feature configurations, wherein the at least one augmented dictionary value maps columnar database values in the columnar partition according to the defined at least one transformation such that the mapped columnar database values correspond to the format for utilization in the at least one artificial intelligence algorithm;
receive a request from an artificial intelligence service for data corresponding to the data stored in the columnar partition;
identify the at least one augmented dictionary value as being responsive to the request from the artificial intelligence service;
transmit the at least one augmented dictionary value to the artificial intelligence service; and
receiving an updated feature configuration from the artificial intelligence service, wherein the updated feature configuration corresponds to at least one of a modification of the at least one transformation to be applied to the set of data or definition of an additional transformation to be applied to the set of data for transforming the set of data into a format for utilization in the at least one artificial intelligence algorithm;
in response to receiving the updated feature configuration from the artificial intelligence service,
update the dictionary to incorporate the updated feature configuration, and
update the generated at least one augmented dictionary value based on the updated feature configuration.

2. The system of claim 1, wherein the management component is further operable to generate a plurality of augmented dictionary values for the data based on the one or more feature configurations, the plurality of augmented dictionary values corresponding to individual transformations into different formats.

3. The system of claim 1, wherein the management component is further operable to generate count information corresponding to a number of entries in the columnar partition for the dictionary.

4. The system of claim 1, wherein received an updated feature configuration from the artificial intelligence service is provided responsive to results of an execution of the at least one artificial intelligence algorithm.

5. A computer-implemented method to manage processing of data in a database service, wherein the data is stored in a columnar partition according to encoding provided by a dictionary, the method comprising:
receiving one or more feature configurations for the data stored in the columnar database, wherein the one or more feature configurations define at least one transformation to be applied to the data for transforming the data into a format for utilization by at least one an artificial intelligence algorithm;
based on the received one or more feature configuration, generating at least one augmented dictionary value for the columnar partition, wherein the augmented dictionary value maps columnar database values in the columnar partition according to the defined at least one transformation such that the mapped columnar database values correspond the format for utilization by the at least one artificial intelligence algorithm;
receiving an updated feature configuration from an artificial intelligence service, wherein the received updated feature configuration corresponds to at least one of a modification of the at least one transformation to be applied to the set of data or definition of an additional transformation to be applied to the set of data for transforming the set of data into a format for utilization in the at least one artificial intelligence algorithm;
in response to receiving the updated feature configuration from the artificial intelligence service,
updating the dictionary to incorporate the updated feature configuration, and
updating the generated at least one augmented dictionary value based on the updated feature configuration;
receiving a request for data corresponding to the data stored in the columnar partition;
identifying the updated at least one augmented dictionary value as being responsive to the request for data; and
transmitting the updated at least one augmented dictionary value to the artificial intelligence service.

6. The computer-implemented method of claim 5 further comprising receiving a set of data from a data service and storing the set of data in an encoded format in the columnar database based on an application of the dictionary.

7. The computer: implemented method of claim 5 further comprising generating a plurality of augmented dictionary values for the dictionary, the plurality of augmented dictionary values corresponding to individual transformations of the data stored in the columnar database into different formats.

8. The computer-implemented method of claim 7, wherein the individual transformations of the data stored in the columnar database include generating at least one of discrete values or numerical values.

9. The computer-implemented method of claim 7, wherein the individual transformation of the data stored in the columnar database includes at least one of numeric conversions, normalization, vector encoding, binarization, quantization, bucketization, or aggregations of columns.

10. The computer-implemented method of claim 5 further comprising generating count information corresponding to a number of entries in the columnar database.

11. The computer-implemented method of claim 5 further comprising:
identifying count information responsive to the request for data; and
transmitting count information responsive to the request.

12. The computer-implemented method of claim 5, further comprising generating at least one additional augmented dictionary value for the dictionary based on the updated feature configuration.

13. The computer-implemented method of claim 12, further comprising modifying the at least one additional augmented dictionary value for the dictionary based on the updated feature configuration.

14. The computer-implemented method of claim 5, wherein receiving a request for data corresponding to the data stored in the columnar database includes receiving a request from the artificial intelligence service.

15. The computer-implemented method of claim 5, wherein receiving the updated feature configuration from the artificial intelligence service includes receiving the updated feature configuration from the artificial intelligence service responsive to results of an execution of the at least one artificial intelligence algorithm.

16. A computer-implemented method to manage data received at a database service, the method comprising:
    storing data in a database according to an encoding provided by a dictionary;
    receiving a feature configuration information from an artificial intelligence service, wherein the feature configuration information defines at least one transformation to be applied to the encoding provided by the dictionary for transforming the data into the format for utilization in at least one artificial intelligence algorithm;
    generating at least one augmented dictionary value based on the feature configuration;
    receiving an updated feature configuration from the artificial intelligence service, wherein the updated feature configuration corresponds to at least one of a modification of the at least one transformation to be applied to the set of data or definition of an additional transformation to be applied to the set of data for transforming the set of data into a format for utilization in the at least one artificial intelligence algorithm;
    responsive to receiving the updated feature configuration information from the artificial intelligence service,
        updating the dictionary to incorporate the updated feature configuration, and
        updating the generated at least one augmented dictionary value based on the updated feature configuration information;
    responsive to a request from the artificial intelligence service for featurization data associated with a columnar database, identifying the at least one updated augmented dictionary value as being responsive to the request for data; and
    transmitting the at least one augmented dictionary value to the artificial intelligence service.

17. The computer-implemented method of claim 16, wherein the data is stored in the columnar database format according to the encoding provided by the dictionary.

18. The computer-implemented method of claim 16 further comprising generating a plurality of augmented dictionary values based on the feature configuration information, the plurality of augmented dictionary values corresponding to individual transformations of the data into different formats.

19. The computer-implemented method of claim 16 further comprising generating count information corresponding to a number of entries in the database.

20. The computer-implemented method of claim 16 further comprising further responsive to receiving the updated feature configuration information, generating an additional augmented dictionary value.

* * * * *